US012185812B2

(12) United States Patent
Offermans et al.

(10) Patent No.: US 12,185,812 B2
(45) Date of Patent: Jan. 7, 2025

(54) ELECTRIC PERSONAL CARE APPARATUS

(71) Applicant: KONINKLIJKE PHILIPS N.V., Eindhoven (NL)

(72) Inventors: Paulus Hubertus Gerardus Offermans, Weert (NL); Antonius Wilhelmus Maria De Laat, Den Dungen (NL); Mona Scholten, Goirle (NL); Ronaldus Mathias Hubertus Steijvers, Nederweert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 420 days.

(21) Appl. No.: 17/773,632

(22) PCT Filed: Nov. 5, 2020

(86) PCT No.: PCT/EP2020/081166
§ 371 (c)(1),
(2) Date: May 2, 2022

(87) PCT Pub. No.: WO2021/094196
PCT Pub. Date: May 20, 2021

(65) Prior Publication Data

US 2022/0378169 A1 Dec. 1, 2022

(30) Foreign Application Priority Data

Nov. 12, 2019 (EP) .................................... 19208683

(51) Int. Cl.
*A45D 27/00* (2006.01)
*A45D 34/04* (2006.01)
*B26B 19/40* (2006.01)

(52) U.S. Cl.
CPC ............ *A45D 27/00* (2013.01); *A45D 34/04* (2013.01); *B26B 19/40* (2013.01); *A45D 2200/25* (2013.01)

(58) Field of Classification Search
CPC ... A45D 27/00; A45D 2026/009; B26B 19/40
See application file for complete search history.

(56) References Cited

U.S. PATENT DOCUMENTS 3,656,234 A * 4/1972 Regan ..................... B26B 19/40
15/104.93
3,663,467 A 5/1972 Albright
(Continued)

FOREIGN PATENT DOCUMENTS

EP 1139951 B1 10/2004
JP 2000014590 A 1/2000
(Continued)

OTHER PUBLICATIONS

International Search Report and Written Opinion Dated Feb. 1, 2021 For International Application No. PCT/EP2020/081166 Filed Nov. 5, 2020.

*Primary Examiner* — J C Jacyna

(57) ABSTRACT

The present invention relates to an electric personal care apparatus comprising a skin contacting portion configured for contact with skin of a user. The skin contacting portion comprises a porous and compressible material. The porous and compressible material is configured to hold a fluid by capillary forces. The porous and compressible material is configured to be compressed due to pressure contact of the skin contacting portion with the skin of the user, and configured to release the fluid onto the skin of the user when the porous and compressible material is holding the fluid and being compressed.

12 Claims, 4 Drawing Sheets

(56) References Cited

U.S. PATENT DOCUMENTS

| | | | |
|---|---|---|---|
| 5,876,640 | A | 3/1999 | Miyahara |
| 6,749,340 | B1 | 6/2004 | Rudd |
| 7,833,615 | B2 | 11/2010 | Ramsey |
| 2004/0096260 | A1 | 5/2004 | Rhoades |
| 2005/0037034 | A1 | 2/2005 | Rhoades |
| 2007/0062042 | A1 | 3/2007 | Kleemann et al. |
| 2007/0098768 | A1 * | 5/2007 | Close .................... D04H 13/00 424/443 |
| 2017/0043150 | A1 * | 2/2017 | Kim .................. A61H 23/0218 |
| 2019/0133299 | A1 | 5/2019 | Marchesano |

FOREIGN PATENT DOCUMENTS

| | | | |
|---|---|---|---|
| JP | 2008030137 | A | 2/2008 |
| JP | 2013063201 | A | 4/2013 |
| JP | 2014105833 | A | 6/2014 |
| JP | 2017001363 | A | 1/2017 |
| WO | 2018/104340 | A1 | 6/2018 |

* cited by examiner

ELECTRIC PERSONAL CARE APPARATUS

CROSS REFERENCE TO RELATED APPLICATIONS

This application is the U.S. National Phase application under 35 U.S.C. § 371 of International Application No. PCT/EP2020/081166 filed Nov. 5, 2020, which claims the benefit of European Patent Application Number 19208683.3 filed Nov. 12, 2019. These applications are hereby incorporated by reference herein.

FIELD OF THE INVENTION

The present invention relates to an electric personal care apparatus, and a personal care system.

BACKGROUND OF THE INVENTION

Electric personal care apparatuses, such as electric shavers, epilator's, and intense pulsed light (IPL) devices, need to be moved over the skin, and friction forces between the apparatus and the skin can result in stick-slip phenomena, which are unpleasant to many users. A lubricating fluid can be applied on the skin to reduce friction forces and mitigate this effect. However, too much or too little fluid can be applied, and it is inconvenient to many users to have to apply the fluid and then use the apparatus.

There is a need to address these issues.

U.S. Pat. No. 3,656,234 discloses an electric shaving device comprising two cutting heads. The shaving device further comprises a skin lubricating member having a sponge material and an integrally attached band member for attachment of the skin lubricating member upon an elastic band by means of an adhesive. The sponge material surrounds the two cutting heads and may be filled with any desired emollient. During use, the emollient is released from the sponge material by pressure of the shaver and the sponge material upon the skin of the user. The skin is thus moistened and softened.

SUMMARY OF THE INVENTION

It would be advantageous to have an improved technique to apply a lubricating fluid when using such electric personal care apparatuses.

The object of the present invention is achieved with the subject matter of the independent claims, wherein further embodiments are incorporated in the dependent claims.

It should be noted that the following described aspects and examples of the invention apply to both the electric personal care apparatus and the personal care system.

In a first aspect of the invention, there is provided an electric personal care apparatus comprising a skin contacting portion configured for contact with skin of a user. The skin contacting portion comprises a porous and compressible material. The porous and compressible material is configured to hold a fluid by capillary forces. The porous and compressible material is configured also to be compressed due to pressure contact of the skin contacting portion with the skin of the user. The porous and compressible material is configured to release the fluid onto the skin of the user when the porous and compressible material is holding the fluid and being compressed. The skin contacting portion comprises a layer applied to a supporting member of the electric personal care apparatus, wherein the layer comprises the porous and compressible material. The layer comprises at least two components, wherein the at least two components comprise a carrier material and a plurality of particles embedded in the carrier material. The carrier material is different from the porous and compressible material, and the plurality of particles comprises the porous and compressible material.

In this manner, a lubricating system is provided for an electric personal care apparatus, such as an electric shaver, trimmer etc. that is in sliding contact with skin during use, by means of which friction forces between the apparatus and the skin are reduced due to release of a lubricating fluid as the apparatus contacts the skin. Lubrication is provided when required and at the correct location in a convenient and efficient way.

Because the skin contacting portion comprises a layer applied to a supporting member of the electric personal care apparatus and the layer comprises the porous and compressible material, an efficient fluid delivery system is provided, and manufacture of the electric personal care apparatus with the lubrication system is facilitated.

Because the layer comprises at least two components, wherein the at least two components comprise a carrier material and a plurality of particles embedded in the carrier material, wherein the carrier material is different from the porous and compressible material, and wherein the plurality of particles comprises the porous and compressible material, the fluid holding and release characteristics can be controlled. In particular, the particles hold the fluid via capillary action and, when compressed, release the fluid as required. The carrier material of the layer acts as a support structure for the fluid holding particles, enabling the provision of an optimized fluid release system.

In a further embodiment of the electric personal care apparatus according to the invention, the layer is coated onto the supporting member.

In this manner, a strong and resilient bond between the layer and the apparatus is provided, and a convenient manufacture means is provided.

In a further embodiment of the electric personal care apparatus according to the invention, the layer is attached to the supporting member.

In this way, the layer can be mass produced for numerous devices and then attached to the apparatuses as required.

In a further embodiment of the electric personal care apparatus according to the invention, the carrier material forms an external surface of the layer arranged to contact the skin of the user. At least some of the plurality of particles protrude from the external surface.

In this way, by selecting a carrier material having a relatively high rigidity, the rigidity of the external surface of the layer will be relatively high, which may be beneficial in particular types of electric personal care apparatuses, such as electric shavers. Despite the high rigidity of the carrier material, the protruding particles comprising the porous and compressible material can still be compressed and release the lubricating fluid.

In the embodiment of the electric personal care apparatus mentioned in the previous paragraph, preferably a thickness of the carrier material is less than an average outer diameter of the particles of the plurality of particles.

In other words, all or almost all of the particles sit proud of the external surface of the layer containing the carrier material, providing for an efficient and effective delivery of the lubricating fluid.

In this manner, it can be ensured that the particles will be able to contact the skin of the user and be compressed as the electric personal care apparatus is in pressure contact with the skin, thereby releasing the fluid exactly where and when required.

In a further embodiment of the electric personal care apparatus according to the invention, the carrier material is compressible.

Thus, the layer can have a carrier material that acts in part as a compressible support structure for the porous and compressible particles embedded in the carrier material. The compressibility of the carrier material will enhance the compressibility of the embedded particles. In the embodiment, the carrier material preferably acts as a fluid delivery part. By being compressible, the whole skin contacting region is very comfortable to the user.

In the embodiment of the electric personal care apparatus mentioned in the previous paragraph, preferably a thickness of the carrier material is greater than or equal to an average outer diameter of the particles of the plurality of particles, and the carrier material is configured to be able to transmit the fluid.

In other words, the supporting part of the layer is compressible and can transmit fluid that is being held by the particles which comprise the porous and compressible fluid holding material. In this embodiment, the majority of particles are fully embedded within the carrier material. Thus, the layer may comprise a relatively large number of porous particles and able to contain a relatively high amount of the fluid. In addition, non-intentional touching of the layer is less likely to compress the particles and lead to non-intentional fluid release. However, when the user intentionally uses the electric personal care apparatus, the layer is compressed and the particles are also compressed. The particles release the fluid due to their compression, and this fluid can then be transmitted via the carrier material to the skin of the user.

In a further embodiment of the electric personal care apparatus according to the invention, the carrier material comprises a fluid transmitting structure having conduits with dimensions perpendicular to a fluid flow direction in a range of 30-50 μm.

Thus, the dimensions of the conduits of the fluid transmitting structure of the carrier material part of the layer are wide enough to allow fluid flow via the conduits not to inhibit or restrict the fluid flow by capillary forces.

In a further embodiment of the electric personal care apparatus according to the invention, the porous and compressible material comprises a plurality of pores and/or channels configured to hold the fluid by capillary forces.

Thus, pores and/or channels, where those channels can be formed from connecting pores, provide the means to hold fluid in an efficient and natural manner via capillary forces.

In a further embodiment of the electric personal care apparatus according to the invention, the plurality of pores and/or channels are configured to release the fluid by compression of the porous and compressible material.

In other words, the pores and/or channels are appropriately sized in order to hold the fluid, but also, when compressed, to allow the fluid to flow out without being restricted or inhibited to a great extent due to capillary forces.

In a further embodiment of the electric personal care apparatus according to the invention, the pores and/or channels have a dimension perpendicular to a fluid flow direction in a range of 150-500 nm.

Thus, the pores and/or channels are sized to enable capillary forces to hold the fluid, whilst enabling the fluid to be released due to compression of the porous and compressible material.

In a second aspect of the invention, there is provided a personal care system comprising:

an electric personal care apparatus according to the first aspect of the invention; and a docking station.

The electric personal care apparatus is configured to dock with the docking station. The docking station is configured to charge the porous and compressible material with the fluid.

The embodiments of the electric personal care apparatus according to the invention and the benefits provided thereby, as described here before, equally apply to the personal care system in accordance with the invention and vice versa.

The above aspects and embodiments of the invention will become apparent from and be elucidated with reference to the figures described hereinafter.

BRIEF DESCRIPTION OF THE DRAWINGS

Exemplary embodiments will be described in the following with reference to the following drawings.

DETAILED DESCRIPTION OF THE EMBODIMENTS

Figure 1:
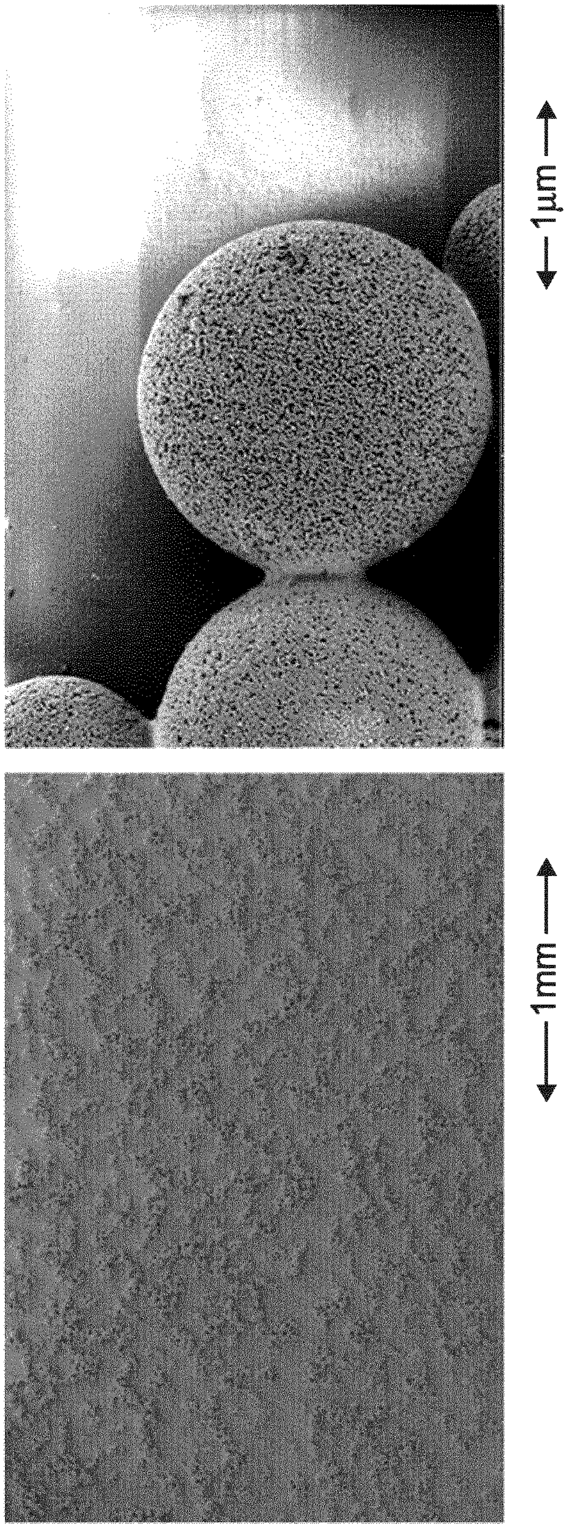
FIG. 1 shows on the left a dried and cured layer comprising a porous compressible material in the form of particles or microbeads, and on the right shows a magnified image of such particles or microbeads where porosity is present in the particles for holding a lubricant.

A new and simple way has been developed for electric personal care apparatuses to hold a lubricating fluid within a skin contacting portion of the apparatus. The fluid can be effectively applied to the skin through contact of the skin contacting portion of the electric personal care apparatus with the skin.

According to the invention, an electric personal care apparatus comprises a skin contacting portion configured for contact with skin of a user. The skin contacting portion comprises a porous and compressible material. The porous and compressible material is configured to hold a fluid by capillary forces. The fluid can be a lubricating fluid, or other fluid as required. The porous and compressible material is configured to be compressed due to pressure contact of the skin contacting portion with the skin of the user. The porous and compressible material is configured to release the fluid onto the skin of the user when the porous and compressible material is holding the fluid and is compressed through pressure contact of the skin contacting portion of the apparatus with the skin of the user.

According to the invention, the skin contacting portion comprises a layer applied to a supporting member of the electric personal care apparatus. The layer comprises the porous and compressible material.

According to an example, the layer is coated onto the supporting member.

In an example, the coating is a sol-gel coating.

According to an example, the layer is attached to the supporting member.

In an example the layer is casted/extruded and then attached to the supporting member of the electric personal care apparatus.

According to the invention, the layer comprises at least two components. The at least two components comprise a carrier material and a plurality of particles embedded in the carrier material. The carrier material is different from the porous and compressible material, and the plurality of particles comprises the porous and compressible material.

According to an example, the carrier material forms an external surface of the layer arranged to contact the skin of the user, and at least some of the plurality of particles protrude from the external surface.

In an example, the carrier material has a degree of compressibility less than a degree of compressibility of the plurality of particles. In other words, the carrier material has a rigidity or stiffness which is higher than a rigidity or stiffness of the plurality of particles. In this example, the plurality of particles can be compressed to a greater degree than the supporting carrier material. Also, this means that, as the skin contacting portion of the electric personal care apparatus is touched or pressed onto the skin, the plurality of particles will be compressed and thus release the lubricating fluid.

In other words, a part of the layer acts as a strong and relatively rigid support structure for the porous and compressible particles that hold the fluid and that sit proud of the supporting structure. The particles become compressed as the skin contacting portion of the apparatus contacts the skin to release the fluid as required.

In this manner, not only is holding and release of the fluid facilitated, but recharging of the particles with fluid is enabled.

In an example the layer is casted/extruded incorporating particles and then the layer is attached to the supporting member of the electric personal care apparatus.

In an example, the layer is applied as a coating that contains the particles.

According to an example, a thickness of the carrier material is less than an average outer diameter of the particles of the plurality of particles.

According to an example, the carrier material is compressible.

According to an example, a thickness of the carrier material is greater than or equal to an average outer diameter of the particles of the plurality of particles. In this example, the carrier material is configured to be able to transmit the fluid.

According to an example, the carrier material comprises a fluid transmitting structure having conduits with dimensions perpendicular to a fluid flow direction in a range of 30-50 μm.

According to an example, the porous and compressible material comprises a plurality of pores and/or channels configured to hold the fluid by capillary forces.

According to an example, the plurality of pores and/or channels are configured to release the fluid by compression of the porous and compressible material.

According to an example, the pores and/or channels have a dimension perpendicular to a fluid flow direction in a range of 150-500 nm.

The porous and compressible material may need to be periodically re-charged with fluid and/or cleaned. Thus, a docking station is configured to enable an electric personal care apparatus, as described above, to dock with it. The docking station and the electric personal care apparatus together form a personal care system. Once the electric personal care apparatus is docked with the docking station, the docking station can charge the porous and compressible material with the fluid.

In an example, the docking station is configured to clean the porous and compressible material prior to charging the porous and compressible material with fluid.

In an example, the docking station is configured to heat the porous and compressible material to clean the porous and compressible material.

Thus, as described above, in an embodiment the skin contacting surface of the electric personal care apparatus is provided with a coating, within which compressible porous particles are embedded. The coating can for example be a sol-gel coating coated onto a supporting member, or can be made separately as a layer and applied to the supporting member of the electric personal care apparatus. After drying and hardening of the coating/layer, the compressible porous particles are fixed in the coating and the porosity of the particles is maintained.

The porous particles can for example be made from Microsponge. Before use of the electric personal care appliance, the porous particles are filled with the lubricating fluid under the influence of capillary forces in the pores of the porous material. In particular, the particles protrude relative to the surface of the coating. Thus, when the surface of the coating is brought into pressure contact with the skin, the porous particles are compressed, so that the lubricating fluid is released from the porous particles and provided to the skin. The lubricating fluid can for example be crodamol, fomblin or another suitable skin-lubricating fluid.

FIG. 1 shows exemplary SEM images of the layer/coating, that has been dried and cured, and is shown with porous particles incorporated. The left image is an overview of the coating with the particles. The right image is an enlarged image of the left hand image, wherein the porosity of the particle is visible. The left hand SEM picture shows a sol-gel matrix, seen as a continuous layer with porous particles sticking out. The zoomed-in SEM picture on the right shows the individual particles with their pores visible.

During manufacture, a fill material is washed out to leave pores and channels formed by pores. The supporting layer can be less compressible than the porous and compressible material itself and be thinner than an average particle size. Thus, the porous and compressible material is compressed when the skin contacting portion of the electric personal care appliance contacts or is pushed against the skin, thereby releasing the lubricating fluid.

However, the supporting layer can be fluid transmitting, but configured not to retain the fluid by capillary forces. Thus, the supporting layer can be thicker than the particles. However, when such a coated device is placed on the skin with a little pressure, the whole layer including the porous particle is compressed. The lubricating fluid can then flow through the supporting layer onto the skin.

Thus, in either embodiment the lubricant is forced out of the porous and compressible material in order to form a thin lubricating fluid layer between the skin contacting portion of the apparatus and the skin, reducing both the stick phenomenon and reducing the friction between apparatus and skin.

Figure 2:
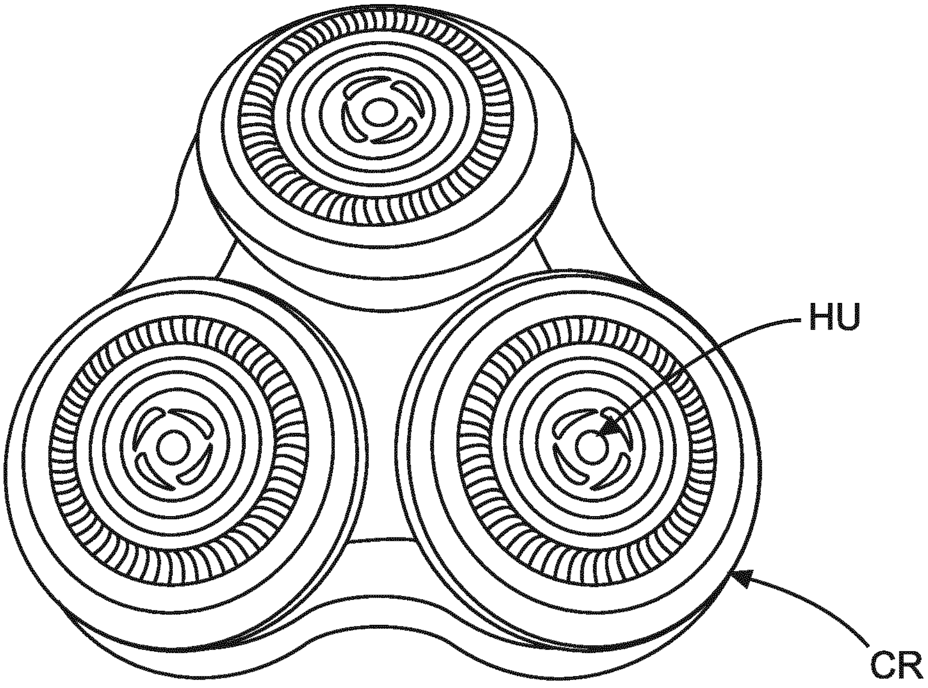
FIG. 2 shows a shaving unit, with the layer as shown in FIG. 1 being applied to the skin-supporting rings surrounding the hair-cutting units of the shaving unit.

FIG. 2 shows an example of an electric personal care apparatus according to the invention, in this example a shaving unit, with the new layer applied to the skin-supporting rings (CR) that surround the hair-cutting units (HU). Here, a layer in the form of a coating is applied on the skin-supporting rings. These skin-supporting rings come into contact with the skin, together with the hair-cutting units, when the shaving unit is pressed against the skin. In this coating, the porous particles are embedded for holding the lubricating fluid.

Figure 3:
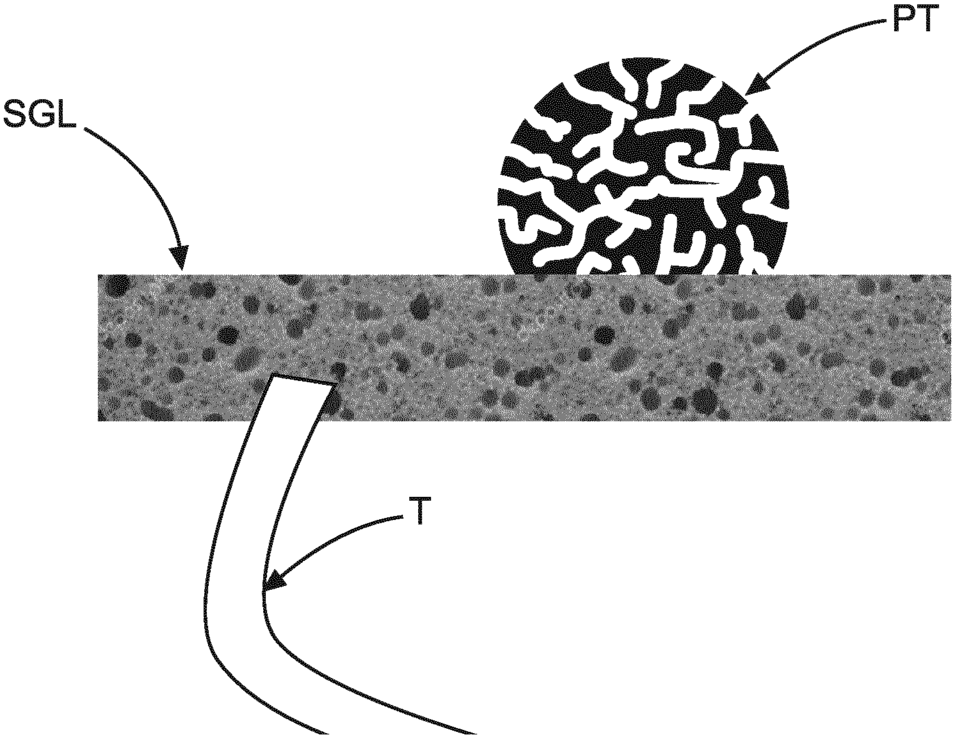
FIG. 3 shows a schematic representation of a sol-gel layer and a porous and compressible particle.

FIG. 3 shows a schematic representation of a sol-gel layer and a porous and compressible particle partially embedded in the sol-gel layer. The sol-gel layer (SGL) is nano/micro and porous, and acts as a supporting member for transport of the lubricating fluid. In the image, the pores in the sol-gel layer are exaggerated as large pores. A representative compressible and porous particle (PT) of the sol-gel layer is shown. Also shown is a tube (T), filled with lubricating fluid and connected to a fluid container (not shown), used to charge the sol-gel layer with the lubricating fluid.

Figure 4:
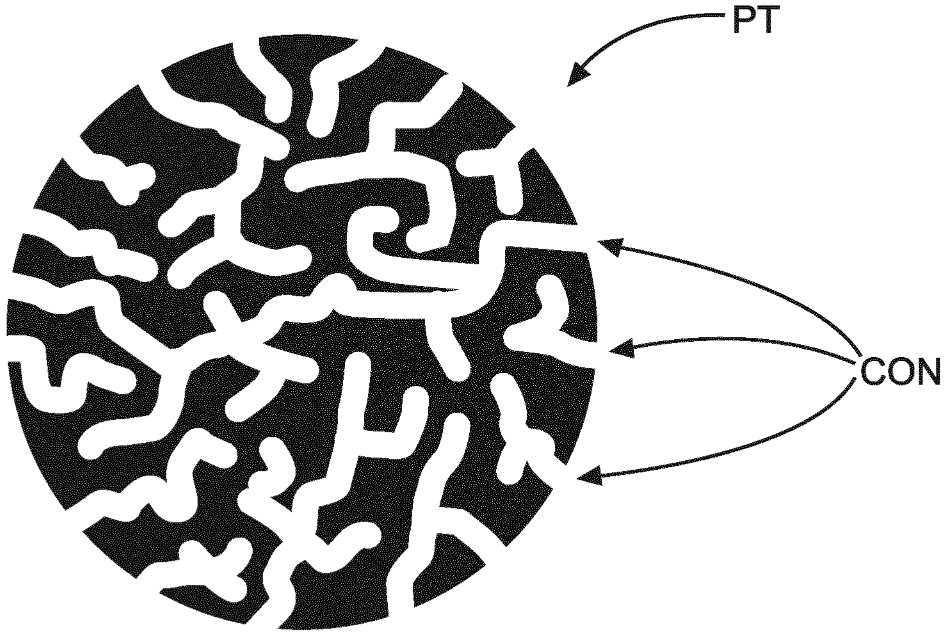
FIG. 4 shows a non-filled porous and compressible particle.
Figure 5:
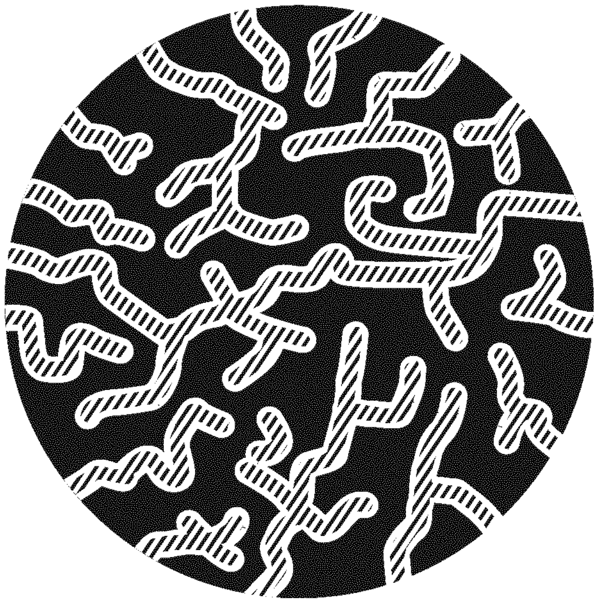
FIG. 5 shows a filled porous and compressible particle.

FIGS. 4 and 5 respectively show a non-filled and a filled porous and compressible particle. FIG. 4 shows the particle with non fluid-filled, open pores, and FIG. 5 shows the particles with fluid-filled pores. In these schematic representations, which show cross—sections of the particle, the capillary structure in a porous particle where the fluid can be stored is evident. The capillary structure comprises conduits (CON) that are not filled with fluid in FIG. 4 and filled with fluid in FIG. 5.

Figure 6:
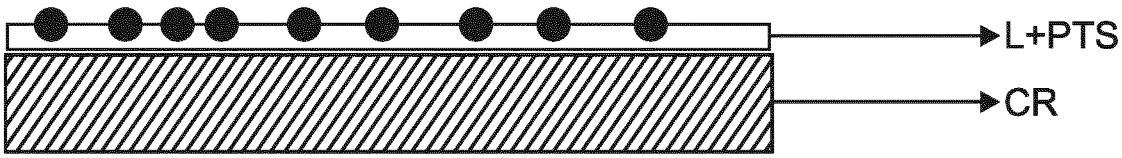
FIG. 6 shows a cross-section of an alternative skin-supporting ring of the shaver as shown in FIG. 2 to which is applied a sol-gel layer with porous and compressible particles.

FIG. 6 shows a schematic representation of a cross-section of an alternative skin-supporting ring (CR) of the shaving unit of FIG. 2 to which is applied a sol-gel layer (L) with compressible and porous particles (PTS) that are protruding out of the layer.

Figure 7:
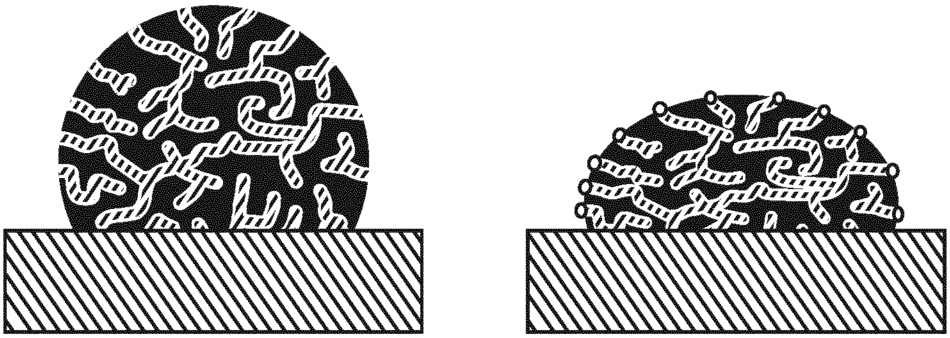
FIG. 7 shows a schematic representation of a non-compressed and a compressed porous particle of the layer of FIG. 6.

FIG. 7 shows a schematic representation of a non-compressed and a compressed particle of the layer (L+PTS) of FIG. 6, where in the left hand image the non-compressed particle is shown, and where in the right hand image the compressed particle is shown. The images show cross-sections of a porous particle filled with fluid and partially embedded in the sol-gel matrix layer. When the layer is in pressure contact with the skin, the particle is compressed, and as a result the pores in the particles are compressed. As a result of the compression, the particle reduces in size and volume. However, the fluid is incompressible and consequently the fluid comes out of the compressed pores and is applied to the skin surface. This situation is shown schematically in the right hand image of FIG. 7.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An electric personal care apparatus comprising a skin contacting portion configured for contact with skin of a user, wherein:

the skin contacting portion comprises a porous and compressible material;

the porous and compressible material is configured to hold a fluid by capillary forces;

the porous and compressible material is configured to be compressed due to pressure contact of the skin contacting portion with the skin of the user, and configured to release the fluid onto the skin of the user when the porous and compressible material is holding the fluid and being compressed, the skin contacting portion further comprises a layer applied to a supporting member of the electric personal care apparatus, wherein the layer comprises the porous and compressible material;

the layer comprises at least two components, wherein the at least two components comprise a carrier material and a plurality of particles embedded in the carrier material, wherein the carrier material is different from the porous and compressible material, and wherein the plurality of particles comprises the porous and compressible material.

2. The electric personal care apparatus according to claim 1, wherein the layer is coated onto the supporting member.

3. The electric personal care apparatus according to claim 1, wherein the layer is attached to the supporting member.

4. The electric personal care apparatus according to claim 1, wherein the carrier material forms an external surface of the layer arranged to contact the skin of the user, and wherein at least some of the plurality of particles protrude from the external surface.

5. The electric personal care apparatus according to claim 4, wherein a thickness of the carrier material is less than an average outer diameter of the particles of the plurality of particles.

6. The electric personal care apparatus according to claim 1, wherein the carrier material is compressible.

7. The electric personal care apparatus according to claim 6, wherein a thickness of the carrier material is greater than or equal to an average outer diameter of the particles of the plurality of particles, and wherein the carrier material is configured to be able to transmit the fluid.

8. The electric personal care apparatus according to claim 7, wherein the carrier material comprises a fluid transmitting structure having conduits with dimensions perpendicular to a fluid flow direction in a range of 30-50 μm.

9. The electric personal care apparatus according to claim 1, wherein the porous and compressible material comprises a plurality of pores and/or channels configured to hold the fluid by capillary forces.

10. The electric personal care apparatus according to claim 9, wherein the plurality of pores and/or channels are configured to release the fluid by compression of the porous and compressible material.

11. The electric personal care apparatus according to claim 9, wherein the plurality of pores and/or channels have a dimension perpendicular to a fluid flow direction in a range of 150-500 nm.

12. A personal care system comprising:

an electric personal care apparatus according to claim 1; and a docking station;

wherein the electric personal care apparatus is configured to dock with the docking station; and wherein the docking station is configured to charge the porous and compressible material with the fluid.

* * * * *